(12) United States Patent
Hardy et al.

(10) Patent No.: US 8,639,407 B2
(45) Date of Patent: Jan. 28, 2014

(54) SWITCH IMAGE CONTROL SYSTEM AND METHOD

(75) Inventors: Rody M. Hardy, Columbus, OH (US); Natarajan S. Manakkal, Dublin, OH (US)

(73) Assignee: Honda Motor Co., Ltd., Tokyo (JP)

(*) Notice: Subject to any disclaimer, the term of this patent is extended or adjusted under 35 U.S.C. 154(b) by 874 days.

(21) Appl. No.: 12/614,880

(22) Filed: Nov. 9, 2009

(65) Prior Publication Data

US 2010/0256855 A1    Oct. 7, 2010

Related U.S. Application Data

(60) Provisional application No. 61/166,899, filed on Apr. 6, 2009.

(51) Int. Cl.
*G06F 7/00* (2006.01)

(52) U.S. Cl.
USPC .......... 701/29.1; 315/77; 362/97.2; 340/425.5

(58) Field of Classification Search
USPC ........... 701/29, 29.1; 340/439, 425.5; 315/77; 362/97.2
See application file for complete search history.

(56) References Cited

U.S. PATENT DOCUMENTS

| | | | |
|---|---|---|---|
| 5,381,074 A * | 1/1995 | Rudzewicz et al. ............. 315/77 |
| 6,158,156 A | 12/2000 | Patrick |
| 6,240,347 B1 * | 5/2001 | Everhart et al. ................. 701/36 |
| 6,529,125 B1 | 3/2003 | Butler et al. |
| 7,009,504 B1 * | 3/2006 | Banter et al. ................... 340/438 |
| 7,106,005 B2 * | 9/2006 | Tsuchiya et al. ................. 315/77 |
| 7,113,077 B2 * | 9/2006 | Masters et al. .............. 340/425.5 |
| 7,246,911 B2 | 7/2007 | Fong |
| 7,441,931 B2 | 10/2008 | Bayersdorfer et al. |
| 7,994,907 B2 * | 8/2011 | Fujisawa et al. ............... 340/461 |
| 8,258,704 B2 * | 9/2012 | Brant ............................... 315/77 |
| 8,509,987 B2 * | 8/2013 | Resner ......................... 701/33.3 |
| 2002/0084891 A1 * | 7/2002 | Mankins et al. ........... 340/425.5 |
| 2002/0140552 A1 * | 10/2002 | Wada ............................. 340/438 |
| 2004/0017282 A1 * | 1/2004 | Eguchi et al. .............. 340/425.5 |
| 2004/0212338 A1 * | 10/2004 | Shimizu et al. ................ 318/469 |
| 2006/0030982 A1 * | 2/2006 | Szczerba et al. ................. 701/29 |
| 2008/0285296 A1 | 11/2008 | Nakagawa |
| 2009/0009983 A1 | 1/2009 | Eich |
| 2009/0065336 A1 | 3/2009 | Bayley et al. |

FOREIGN PATENT DOCUMENTS

| | | |
|---|---|---|
| DE | 10114588 | 10/2002 |
| WO | 0034067 | 6/2000 |
| WO | 2008061786 | 5/2008 |

OTHER PUBLICATIONS

European Search Report of European Patent Application No. 10155580.3 dated Sep. 21, 2010.

\* cited by examiner

*Primary Examiner* — Tuan C. To

(74) *Attorney, Agent, or Firm* — Rankin, Hill & Clark LLP

(57) ABSTRACT

A switch image control system includes at least one first switch having a first image viewable when a backlighting is applied to the at least one first switch. The system also includes at least one second switch having a second image viewable when the backlighting is applied to the at least one second switch. The backlighting is independently applicable to either or both of the at least one first switch and the at least one second switch.

21 Claims, 9 Drawing Sheets

| +B (70) | ACC (72) | IG2 (74) | AUDIO POWER (76) | HFL MODE (78) | SMALL (80) | AIRCOM (82) | VOLUME (84) | HVAC BUTTONS (86) | AUDIO BUTTONS (88) |
|---|---|---|---|---|---|---|---|---|---|
| ON | OFF | OFF | OFF | ON | OFF | OFF | DAY | OFF | OFF |
| ON | OFF | OFF | OFF | ON | ON | OFF | DAY/NIGHT | DAY/NIGHT | OFF |
| ON | OFF | OFF | OFF | OFF | OFF | OFF | OFF | OFF | OFF |
| ON | OFF | OFF | OFF | OFF | ON | OFF | OFF | DAY/NIGHT | OFF |
| ON | OFF | OFF | ON | ON | OFF | OFF | DAY | OFF | OFF |
| ON | OFF | OFF | ON | ON | ON | OFF | DAY/NIGHT | DAY/NIGHT | OFF |
| ON | OFF | OFF | ON | OFF | OFF | OFF | DAY | OFF | DAY |
| ON | OFF | OFF | ON | OFF | ON | OFF | DAY/NIGHT | DAY/NIGHT | DAY/NIGHT |
| ON | ON | ON | OFF | | OFF | ON | DAY | DAY | OFF |
| ON | ON | ON | OFF | | ON | OFF | DAY | DAY | OFF |
| ON | ON | ON | OFF | | OFF | ON | DAY/NIGHT | DAY/NIGHT | OFF |
| ON | ON | ON | OFF | | ON | ON | DAY/NIGHT | DAY/NIGHT | OFF |
| ON | ON | ON | ON | | OFF | OFF | DAY | DAY/NIGHT | DAY |
| ON | ON | ON | ON | | ON | ON | DAY/NIGHT | DAY/NIGHT | DAY |
| OFF | OFF | OFF | OFF | | OFF | OFF | OFF | OFF | DAY/NIGHT |
| OFF | OFF | OFF | OFF | | ON | OFF | OFF | OFF | DAY/NIGHT |
| OFF | OFF | ON | OFF | | OFF | OFF | OFF | OFF | OFF |
| OFF | OFF | ON | OFF | | ON | OFF | OFF | DAY | OFF |
| OFF | ON | OFF | OFF | | OFF | ON | OFF | DAY/NIGHT | OFF |
| OFF | ON | ON | OFF | | OFF | OFF | DAY/NIGHT | DAY/NIGHT | OFF |
| OFF | ON | ON | OFF | | ON | ON | DAY/NIGHT | DAY/NIGHT | OFF |

*Fig. 4*

SWITCH IMAGE CONTROL SYSTEM AND METHOD

This application claims the benefit of provisional patent application Ser. No. 61/166,899, filed Apr. 6, 2009, which is incorporated by reference in its entirety herein.

BACKGROUND

Exemplary embodiments herein generally relate to vehicle control switches, and more particularly relate to selectively illuminated images on vehicle control switches.

Conventional vehicle control switches, such as audio and HVAC switches, typically have printed or etched text and/or icons thereon. The text and/or icons identify the function of the particular switch. The printed or etched text and/or icons are generally always visible if sufficient ambient light is present within the vehicle cabin. Sometimes the printing or etching is also backlightable for nighttime viewing in addition to being viewable with ambient light during the daytime.

More recently, some vehicle manufacturers have been using "black-out" technology. Such technology allows an image to be viewable only when it is backlit. That is, the image is not viewable regardless of the amount of ambient or other light present. Rather, viewing of the image is only possible when backlighting of the image occurs.

Conventional uses of such black-out technology in vehicles include providing an indicator of the status or condition of a vehicle component. For example, an OFF indicator is only viewable via backlighting when an associated passenger airbag is disabled or non-functional. Another vehicle manufacturer presently employs touch sensor switches on the driver's side door. These switches include images that are only viewable upon backlighting. To actuate backlighting of these switches, which can be used to unlock the vehicle when a predetermined code is entered through the switches, the user swipes his or her hand over the switches.

Still other others have been known to employ touch sensor switches for audio and HVAC systems in vehicles that employ black-out technology. For example, one known control panel includes mode selector buttons that, when selected, change the operating mode of a control switch (e.g., to HVAC mode or audio mode). In addition, certain switches and displays around the control switch become visible on the control panel corresponding to the selected selector button and its operating mode. Other switches and displays are not visible until their corresponding selector button (and mode) is selected.

SUMMARY

In accordance with one aspect, a switch image control system is provided for a vehicle including at least one first switch having a first image viewable when a backlighting is applied to the at least one first switch and at least one second switch having a second image viewable when the backlighting is applied to the at least one second switch. The backlighting is independently applicable to either or both of the at least one first switch and the at least one second switch.

According to another aspect, a switch image control method is provided for a vehicle. In the method according to this aspect, at least one first switch having a first image is provided. Also, at least one second switch having a second image is provided. One or both of the at least one first switch and the at least one second switch are selectively and independently backlit to illuminate the first image and/or the second image.

According to yet another aspect, a switch image control system is provided for a vehicle. More particularly, in accordance with this aspect, the system includes at least one first switch having a first image viewable when a backlighting is applied to the at least one first switch and at least one second switch having a second image viewable when the backlighting is applied to the at least one second switch. The backlighting is applied to one or both the at least one first switch and the at least one second switch based on at least one operating condition of the vehicle.

According to still yet another aspect, a switch image control system for a vehicle includes a first group of switches having first images viewable thereon when a backlighting is applied thereto and a second group of switches having second images viewable thereon when the backlighting is applied thereto. The first group of switches corresponds to a first vehicle sub-system and the second group of switches corresponds to a second vehicle sub-system. The backlighting is applied to one or both of the first group of switches and the second group of switches based on at least one of: an ignition state of the vehicle, an ON or OFF state of a backup power supply of the vehicle, an ON or OFF state of a lighting system of the vehicle, an ON or OFF state of an audio system of the vehicle, an ON or OFF state of a HVAC system and an ON or OFF state of a communication system of the vehicle.

According to a further aspect, a switch image control method is provided for a vehicle. In the method according to this aspect, at least one first switch having a first image is provided and at least one second switch having a second image is provided. One or both of the at least one first switch and the at least one second switch is selectively and independently backlit to, respectively, illuminate the first image and illuminate the second image based on at least one operating condition of the vehicle.

BRIEF DESCRIPTION OF THE DRAWINGS

FIG. 4 is an exemplary control matrix for selectively and independently backlighting control switches of the HVAC system and audio system of FIG. 3.

DETAILED DESCRIPTION

Figure 1:
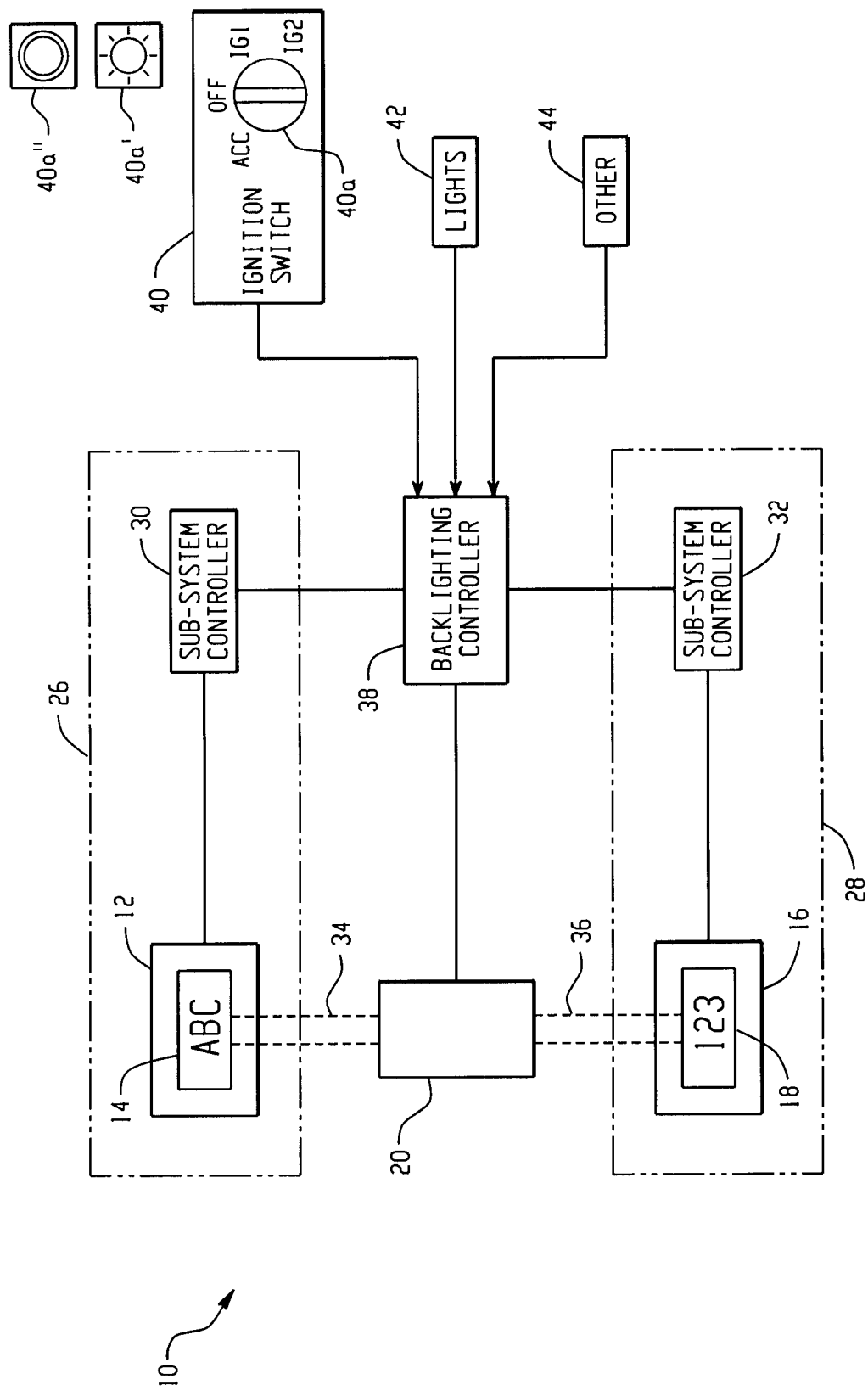
FIG. 1 is a schematic view of a switch image control system for a vehicle.

Referring now to the drawings wherein the showings are for the purposes of illustrating one or more exemplary embodiments, FIG. 1 schematically illustrates a switch image control system for a vehicle, the system generally designated by reference numeral 10. The system 10 includes at least one first switch (e.g., switch 12) having a first image 14 viewable when a backlighting 20 is applied to the switch 12. The system 10 further includes at least one second switch (e.g., switch 16) having a second image 18 viewable when the backlighting 20 is applied to the second switch 16. Backlighting 20 can be independently applicable to either or both of the at least one first switch 12 and the at least one second switch 16. In particular, the first and second switches 12, 16 can employ black-out technology that allows the first image 14 to be viewable only when the backlighting 20 is applied to the first switch 12 and likewise allows the second image 18 to be viewable only when the backlighting 20 is applied to the second switch 16. In an exemplary embodiment, as will be described in more detail below, the backlighting 20 can be applied to one or both the first and second switches based on at least one operating condition of the vehicle.

The first and second images 14, 16 on the switches 12, 16 can be comprised of text and/or icons, which can be representative of the function of the switch. By using black-out technology, the first switch 12 has a black-out appearance (i.e., the first image is not viewable) when the backlighting 20 is not applied to the first switch 12. Similarly, the second switch 16 has a black-out appearance (i.e., the second image 18 is not viewable) when the backlighting 20 is not applied to the second switch 16. As will be described in more detail below, backlighting of the images on the switches can be used to indicate the active status of the switches and/or the underlying devices or systems corresponding to the switches.

Figure 2A:
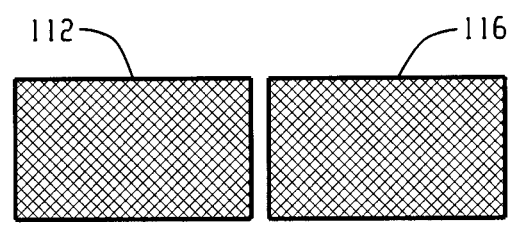
FIG. 2A is a diagram of two switches shown in a backlight OFF condition.
Figure 2B:
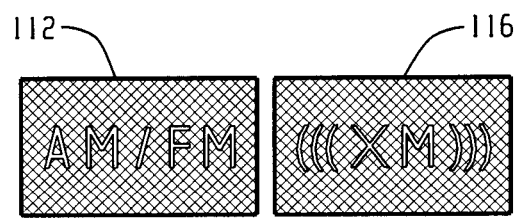
FIG. 2B is a schematic view of the same two switches shown in a backlight ON condition.

With additional reference to FIGS. 2A and 2B, a pair of switches 112, 116, which could be the first and second switches 12, 16, is illustrated. In FIG. 2A, the illustrated switches 112, 116 have a black-out appearance and thus images of these switches 112, 116 are not viewable. As shown, the "black-out" appearance of the switches 112, 116 (FIG. 2A) is a blank non-descriptive appearance. In FIG. 2B, backlighting for the illustrated switches 112, 116 is turned on and thus images of the illustrated switches 112, 116 are viewable (e.g., "AM/FM" and "(((XM)))"). Ambient lighting, or lighting other than the backlighting, has no effect on the viewability of the switches 112, 116. Accordingly, images of the switches 112, 116 cannot be seen with the provision of ambient light absent backlighting.

Likewise, with reference back to FIG. 1, the first image 14 and the second image 18 are not visible with ambient lighting when the backlighting 20 is not applied to the first switch 12 and the second switch 16. In addition to ambient lighting, the first image 14 and the second image 18 are not visible even with front side lighting (e.g., vehicle cabin lighting, such as a dome light) when the backlighting 20 is not applied to the first and second switches 12, 16. Only the application of the backlighting 20 to the switches 12, 16 enables viewing of the respective images 14, 18 thereon.

In addition to providing a neat styling effect, backlighting of the images 14 or 18 on the switches 12, 16 (or the absence thereof) can be used to provide further information to a vehicle user. More particularly, in one embodiment, application of the backlighting 20 to the first switch 12 can correspond with an operational status of the first switch 12. Likewise, application of the backlighting 20 to the second switch 16 can correspond to the operational status of the second switch 16. In contrast to conventional images provided on vehicle switches, which allow images on the switches to be seen with ambient light, the system 10 can use the backlighting or absence of backlighting (i.e., switch images turned on or off) to reflect the operational status of the switches. In one embodiment, the operational status of the first switch 12 is active when the backlighting 20 is applied to the first switch 12 and the first image 14 is illuminated, and inactive when the backlighting 20 is not applied to the first switch 12 and the first image 14 is blacked out. Similarly, the operational status of the second switch 16 can be active when the backlighting 20 is applied to the second switch 16 and the second image 18 is illuminated, and inactive when the backlighting 20 is not applied to the second switch 16 and the second image 18 is blacked-out.

As shown in FIG. 1, the first switch 12 can correspond to a first vehicle sub-system 26 and the second switch 16 can correspond to a second vehicle sub-system 28. As is known and understood by those skilled in the art, input from the first switch 12 (e.g., depression of the first switch) can be received or communicated to a sub-system controller 30 of the first sub-system 26. Similarly, the second switch 16 can be associated with a sub-system controller 32 of the second sub-system 28 such that actuation of the second switch 16 (e.g., by depression thereof) is communicated to the sub-system controller 32. The backlighting source 20 can be operatively connected to the switches 12, 16 as schematically indicated at 34 and 36 such that backlighting of the switches 12, 16 via the backlighting 20 is selectively and independently controllable. In one embodiment, a backlighting controller 38 is included in the system 10 for controlling backlighting 20 to the switches 12, 16. The backlighting controller 38 can be linked to the sub-system controllers 30, 32 of the sub-systems 26, 28, respectively, such that the backlighting controller 38 receives indications from the controllers 30, 32 as to when backlighting of the switches 12 and 16 is to be turned on and off.

The backlighting controller 38 can additionally receive status or condition signals from other vehicle sub-systems, components, devices, etc., such as from the ignition state controller 40, particular vehicle lights or a lighting system 42 (e.g., small or parking lights, vehicle headlights, etc.), or other vehicle components or systems 44 (e.g., audio power button, hands-free call systems, etc.). This enables the backlighting of one or both of the switches 12, 16 to be based on at least one operating condition of the vehicle in which the switches 12, 16 are employed. By way of example, the at least one operating condition of the vehicle could be or correspond to any one or more of the following: an ignition state vehicle (e.g., as determined by the ignition state controller 40); an ON or OFF state of a backup or +B power supply of the vehicle; an ON or OFF state of a lighting system (e.g., parking lights, headlights, etc.) of the vehicle; an ON or OFF state of an audio system of the vehicle; an ON or OFF state of a HVAC system; and/or an ON or OFF state of a communication system (e.g., a hands free call system) of the vehicle.

The ignition state controller 40 can be a switch, push button or other control mechanism for changing the ignition state of the vehicle. In one example (the illustrated embodiment), the controller 40 is a keyed ignition switch having rotatable cylinder with a key slot 40a for receiving an ignition key (e.g., a conventional mechanical key or an electronic key or key fob). Once inserted, the ignition state can be changed by rotating the inserted key. The ignition states could include, for example, an off state, an accessory state (ACC), a run state (IG1) and a start state (IG2). An additional state could be a state wherein the key is removed from the key slot 40a when the ignition state controller 40 is configured to receive a key in the slot 40a.

In an alternate embodiment, the key slot 40a could be replaced with a rotatable switch 40a' or other control device that is rotatable to various positions corresponding to ignition states of the vehicle and thus does not require insertion of a key. In another alternate embodiment, the ignition controller 40 could include a push button 40a", such as the type employed in a push button start system. In this embodiment, changing of the ignition states could be effected by pushing the push button. For example, from an off state the button 40a" could be pressed one time to change the state to the accessory state and could be pressed again to start the vehicle and remain in a run state. A third press of the push button 40*a*" could change the state back to the off state. It is contemplated that other sequences, etc. could be used with the push button 40*a*" to change the ignition states.

Figure 3:
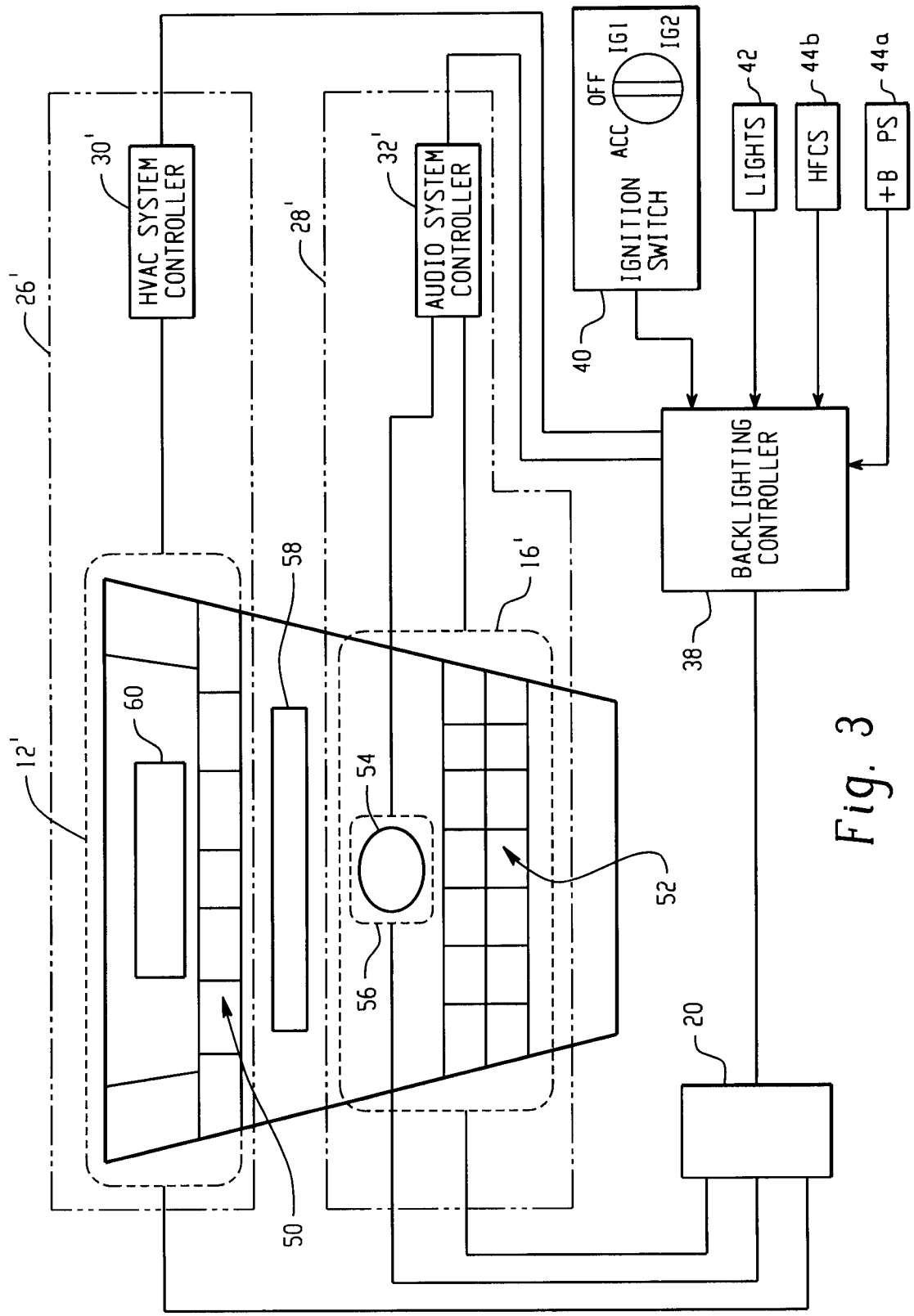
FIG. 3 is a schematic view of a switch image control system for an audio system and an HVAC system in a vehicle.

With reference to FIG. 3, one implementation of the above-described system 10 is illustrated for a vehicle's HVAC system 26' and audio system 28'. In FIG. 3, the at least one first switch is a first group of switches 12' corresponding to a first vehicle sub-system, such as an HVAC system 26'. The at least one second switch is a second group of switches 16' corresponding to another or second vehicle sub-system, such as audio system 28'. As illustrated, the first group of switches 12' can include a plurality of HVAC control switches 50 for controlling the HVAC system 26' through an HVAC system controller 30°. The second group of switches 16' can include a plurality of audio control switches 52 that control the audio system 28' through an audio system controller 32'.

Figure 5A:
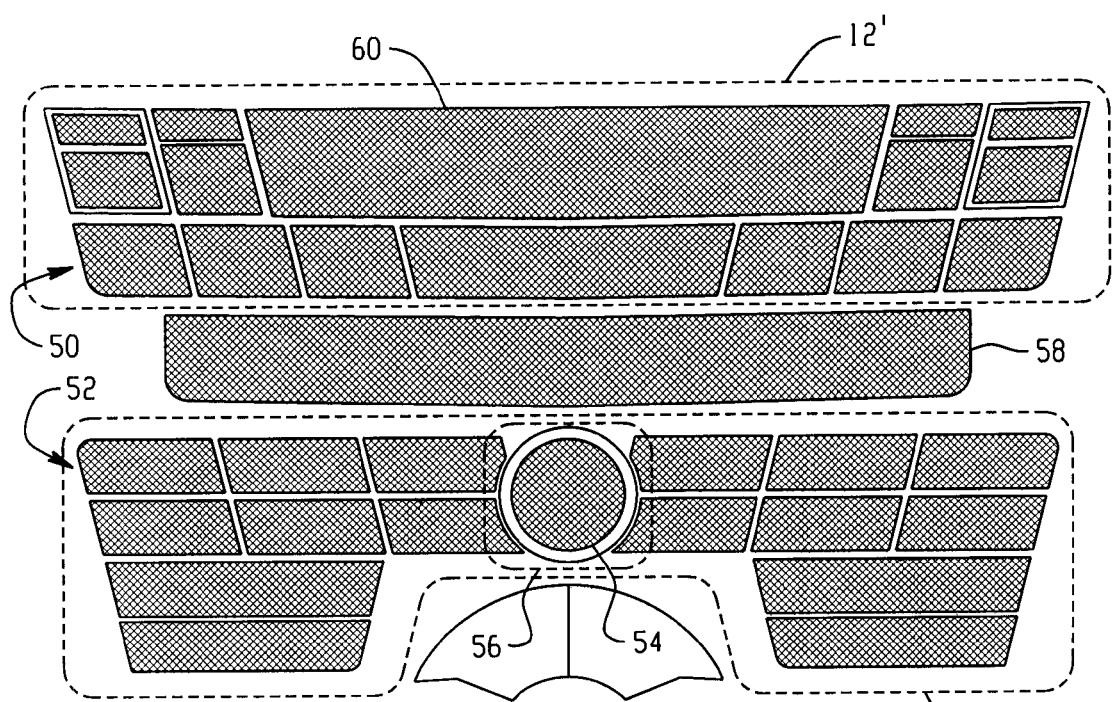
FIGS. 5A-5G show views of HVAC control switches and audio control switches corresponding to the control matrix of FIG. 4.
Figure 5B:
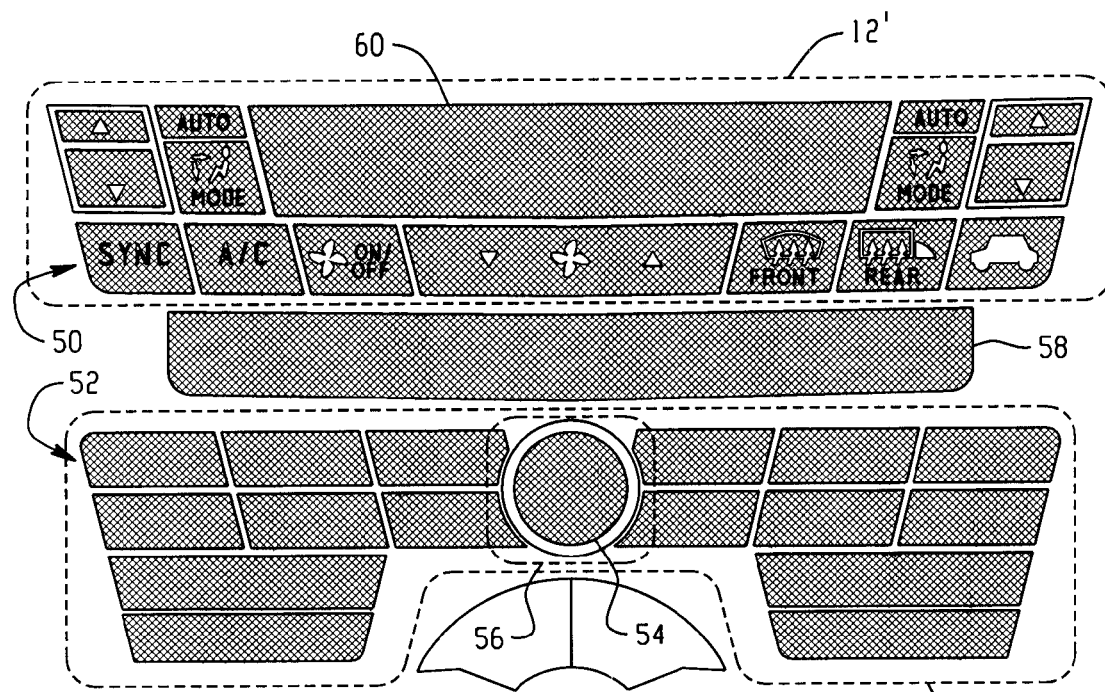

Each of the switches 50 can have respective first images (e.g., first image 14) thereon that are viewable when backlighting 20 is applied to the group of switches 12' (see FIG. 5B for example). Similarly, each of the second group of switches 16' can have respective second images (e.g., second image 18) thereon that are viewable when backlighting 20 is applied to the second group of switches 16' (See FIG. 5C for example). As will be described in more detail below, the backlighting 20 can be applied to one or both of said first group of switches 12' and the second group of switches 16' based on at least one an ignition state of the vehicle, an ON or OFF state of a +B or backup power supply 44*a* of the vehicle, an ON or OFF state of a lighting system 42 (e.g., parking lights, headlights, etc.) of the vehicle, an ON or OFF state of an audio system 28' of the vehicle, an ON or OFF state of the HVAC system 26', and/or an ON or OFF state of a communication system 44*b* (e.g., a hands free call system) of the vehicle.

Figure 5C:
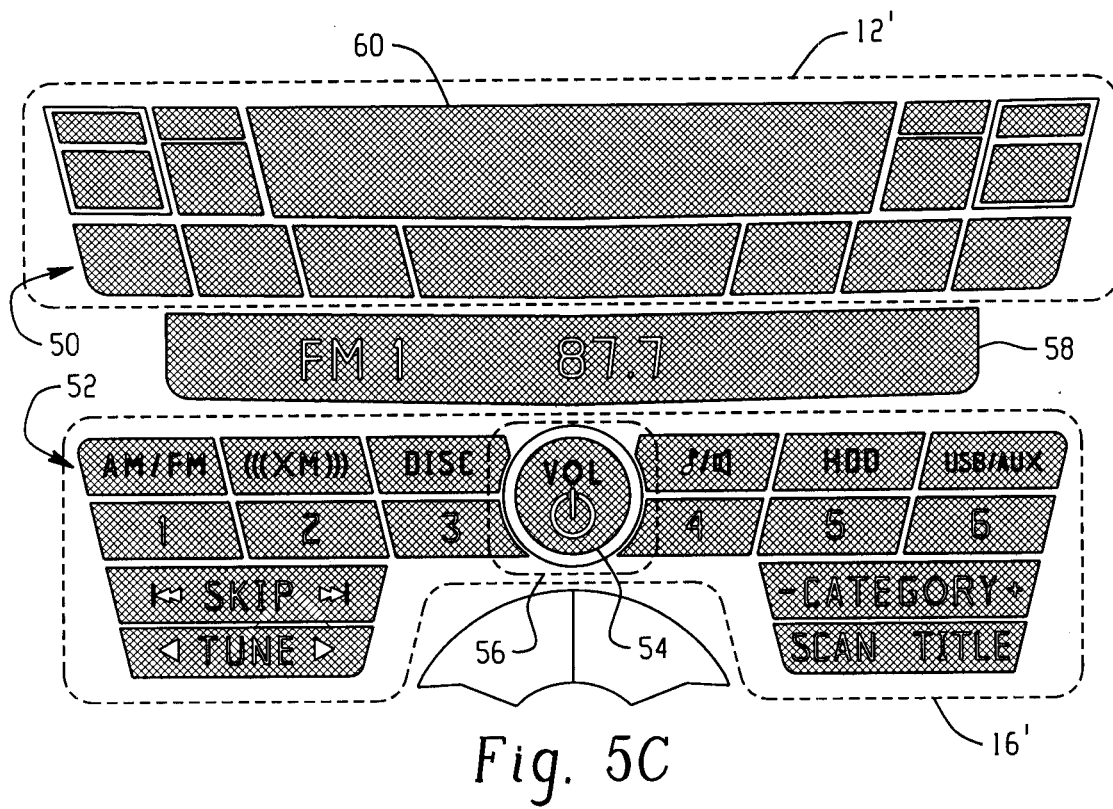
Figure 5D:
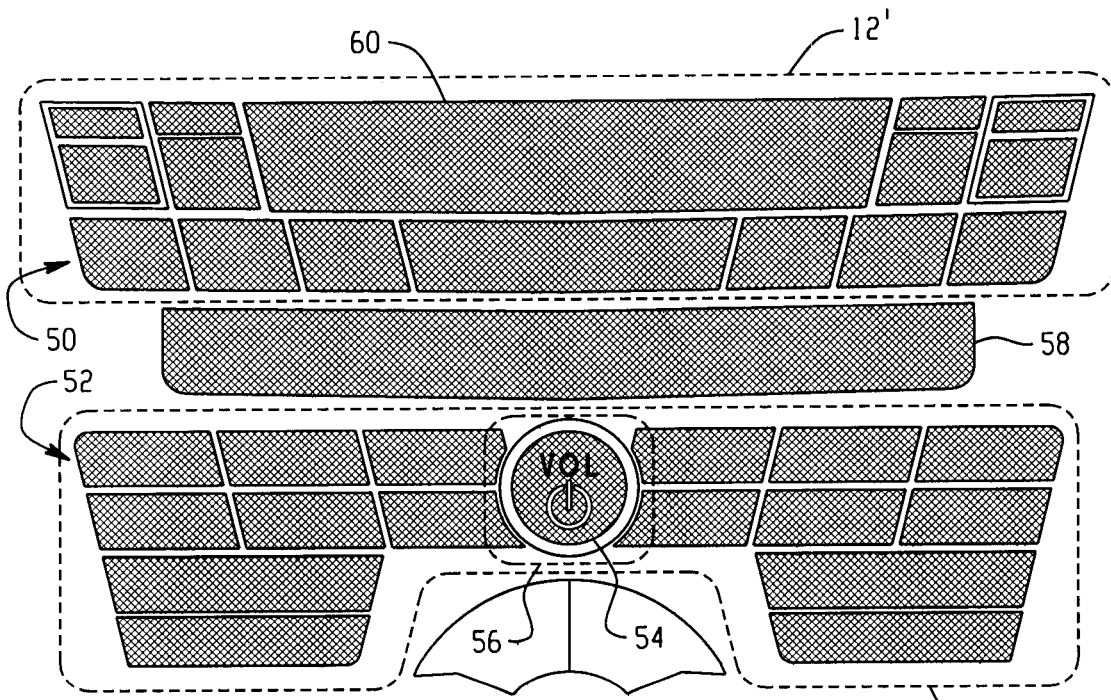
Figure 5E:
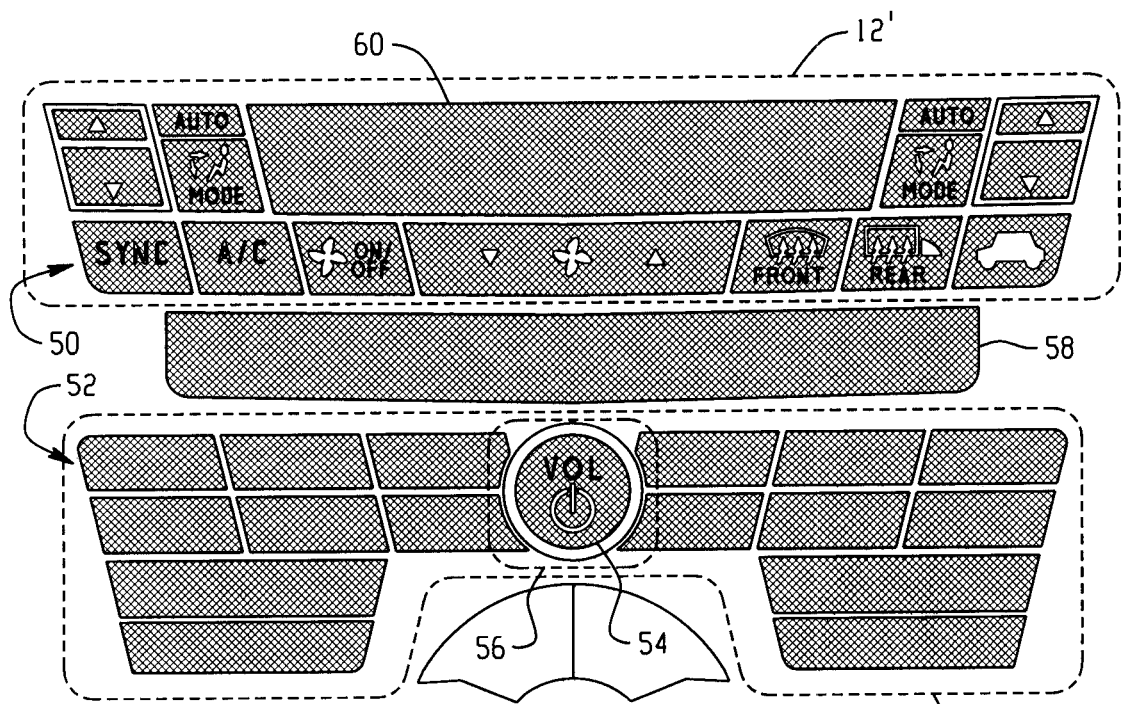
Figure 5F:
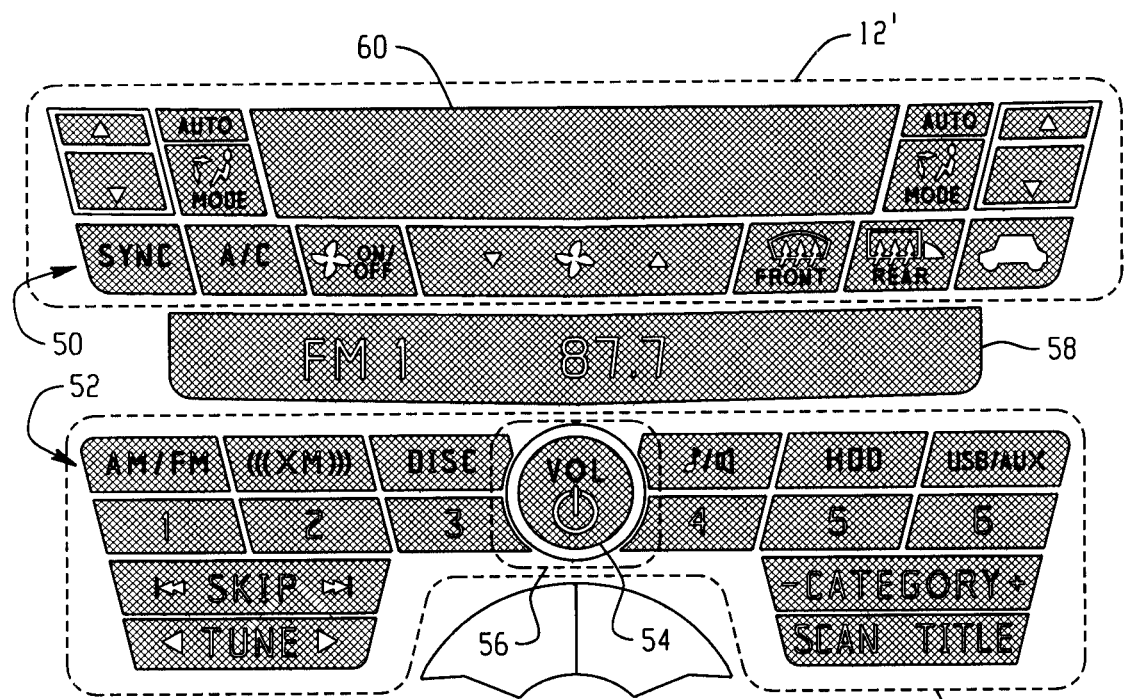
Figure 5G:
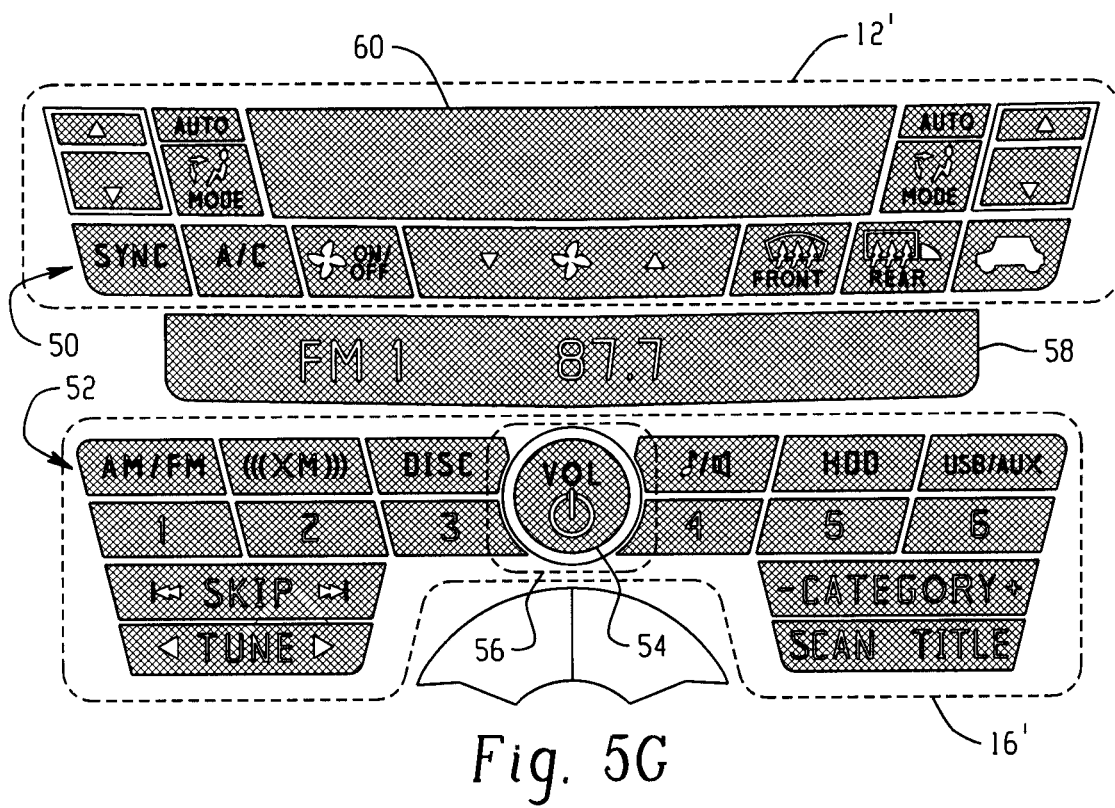

Also in the embodiment illustrated in FIG. 3, an audio power switch 54, which can comprise a third group 56, can have a third image thereon that is viewable when backlighting 20 is applied to the audio power switch 54 (See FIG. 5C for example). Like the groups 12' and 16', the backlighting 20 can be applied to the audio power switch 54 based on at least one of the ignition state of the vehicle, the ON or OFF state of a +B or backup power supply 44*a* of the vehicle, the ON or OFF state of a lighting system 42 (e.g., parking lights, headlights, etc.) of the vehicle, the ON or OFF state of an audio system 28' of the vehicle, an ON or OFF state of the HVAC system 26', and/or the ON or OFF state of a communication system 44*b* (e.g., a hands free call system) of the vehicle.

Backlighting of the groups of switches 12', 16', 56 can be controlled via backlighting controller 38. In particular, the controller 38 can independently apply the backlighting 20 to any one or more of the group of HVAC control switches 50, the group of audio control switches 52 and/or the audio power switch 54. In addition, in the illustrated embodiment, a display panel 58 can be provided for displaying information associated with the audio system 28' (See FIG. 5C for example) and a display panel 60 can be provided for displaying information associated with the HVAC system 26'. The images on the switches 50, 52, 54 are only viewable when backlighting is provided to the groups 12', 16', 56 in which the switches are included. Absent backlighting, the switches 50, 52, 54 have a black-out appearance (see FIG. 2A) and thus images thereon are not visible even with ambient lighting or other front side lighting.

When the backlighting is based on the ignition state, the states could include an off state, an accessory state, a start state and a run state. When used with a key-type ignition switch or a rotatable switch, the states can correspond to key positions such as: removed from key slot 40*a*, inserted in the key slot 40*a* and in the OFF position, inserted in the key slot 40*a* and in the ACC position, and inserted in the key slot 40*a* and in an ON position (e.g., the IG2 position, which can be the normal engine running position). When used with a push button (e.g., push button 40") of a push button start system, the ignition states can correspond to depressions of the push button (e.g., a single depression for the accessory state, a second depression for starting and running of the vehicle, and a third depression to revert to the off state). In one exemplary embodiment, the only states of concern are the ACC state and the IG2 state, and backlighting is applied based on whether the ignition switch 40 is in one of these states. When the backlighting is based on the ON or OFF state of a vehicle lighting system 42, the lighting system 42 can be the vehicle's parking lights such that the backlighting is applied to one or more of the groups 12', 16', 56 in which the switches are included based on the ON or OFF state of the parking lights. As is known by those skilled in the art, the vehicle can be configured such that the parking lights are always on when the vehicle's headlights are turned on. When the backlighting is based on the ON or OFF state of a communication system 44*b* of the vehicle, the communication system 44*b* can be a hands free call system of the vehicle such that the backlighting is applied to one or more of the groups 12', 16', 56 in which the switches are included based on the ON or OFF state of the hands free call system.

Backlighting of the group 12', 16', 56 can also correspond to an operational status of the groups of switches. For example, backlighting 20 can be applied to the group 12' only when the switches 50 are active and functional. Likewise, backlighting 20 can be applied respectively to the group 16' or 56 only when the respective switches 52, 54 are active and functional. Accordingly, backlighting of the groups 12', 16', 56, which can be done independently, can be used to indicate when switches of the groups are active. Independent backlighting allows the groups of switches 12', 16', 56 to be turned on and off independently.

With reference to FIG. 4, one exemplary control matrix is illustrated for the backlighting controller 38, though it is to be appreciated that other control matrices could alternately be employed. In the illustrated control matrix, the operating conditions of the vehicle upon which the backlighting 20 is based include: the ON or OFF state of the backup or +B power supply 44*a*, the ignition state of the ignition switch 40 (particularly, whether the state is one of the ACC state or the IG2 state), the ON or OFF state of the audio system 28', the ON or OFF state of a hands free call system 44*b*, the ON or OFF state of the vehicle's parking lights 42 and the ON or OFF state of the vehicle's HVAC system 26'.

In the control matrix, the "+B" column 70 represents the backup function or +B power supply 44*a* of the vehicle. The "ACC" column 72 represents the accessory state of the ignition switch 40. The "IG2" column 74 represents the run state of the ignition switch 40. The "Audio Power" column 76 represents the state (i.e., ON or OFF) of the audio system 28' as controlled by the audio power button 54. The "HFL Mode" column 78 represents the state of the hands-free call system 44*b*. The "SMALL" column 80 represents the state of the vehicle's small or parking lights 42, which can be used as an indication representing when the vehicle's headlights are turned on. The "Aircorn" column 82 represents the state of the vehicle's HVAC system 26', such as when that system 26' is turned on and is active, or off and inactive. The "VOLUME" column 84 represents the state (i.e., backlighting on or backlighting off) of the audio power button 54, which also serves to control volume of the audio system 28'. The "HVAC BUT- TONS" column 86 represents the state (i.e., backlighting on or backlighting off) of the HVAC buttons 50 of group 12' as controlled by the backlighting controller 38. The AUDIO BUTTONS" column 88 represents the state (i.e., backlighting on or backlighting off) of the audio buttons 52 of group 16'.

As will be appreciated from the control matrix of FIG. 4, the HVAC switches 50 of the first group 12' are active and thus backlit via backlighting 20 at all times when the ignition switch 40 is in the run state (i.e., IG2) as indicated in column 74. Such backlighting can correspond to a day or night state of the vehicle. For example, when the vehicle's headlights are turned OFF as indicated in column 80, a day brightness setting can be applied, whereas when the headlights are ON, a dimmer night brightness level can be applied. Sometimes per regulations, the HVAC switches 50, or more particularly the images thereon, are required to be visible whenever the vehicle headlights are on. Accordingly, anytime the vehicle's headlights are turned on as indicated in column 80, the HVAC buttons 50 (i.e., group 12') are turned on to one of the day or night brightness settings.

As indicated in column 88, the audio power switch 54 is backlit and active anytime the ignition switch 40 is set for the ACC state, which is indicated in column 72, or in the run state (i.e., IG2), which is indicated in column 74. Again, day and night brightness levels can be used corresponding to whether the vehicle's headlights are turned on or off which is indicated in column 80. Additionally, the audio power switch 54 can be backlit and active even when the ignition switch 40 is set for the ACC state or in the run state (columns 72 and 74) if the hands-free call system 44b is being used (e.g., a hands-free call is in progress), which is indicated in column 78. The audio switches 52 of group 16' can be backlit and active whenever the ignition switch 40 is set for the ACC or run key states (columns 72 and 74) and the audio system 28' is powered on, which is indicated in column 76.

Turning to FIG. 5, the various states of the groups 12', 16', and 56 are shown corresponding to the matrix table of FIG. 4. In particular, FIG. 5A illustrates all switches 50, 52, 54 of the groups 12', 16', and 56 turned off (i.e., no backlighting and thus black-out appearance). FIG. 5B illustrates the condition wherein the ignition state of the ignition switch 40 is off (i.e., not in the ACC or run states), but the headlights are turned on, thus the HVAC switches 50 of group 12' are backlit. FIG. 5C illustrates the condition where the ignition state of the ignition switch 40 is the ACC state, the audio system 28' is turned on, and the headlights are turned off as indicated by the parking lights 42. As shown, in this condition, the switches 52 of group 16' are backlit and active. FIG. 5D illustrates the condition where the ignition state of the ignition switch 40 is in the ACC state, the audio system 28' is turned off, and the headlights are turned off; thus, none of the groups 12', 16', 56 of switches 50, 52, 54 are backlit or active (i.e., all are blacked-out). FIG. 5E illustrates the condition where the ignition switch 40 is in the run position (i.e., IG2), the audio system 28' is turned off, and the headlights are on or off. As shown, in this condition, the switches 50 of group 12' are backlit and active. FIG. 5F illustrates the condition where the ignition state of the ignition switch 40 is the run state, the audio system 28' is on, and the headlights are turned on or off. In this condition, all groups 12', 16', 56 of switches 52, 54 are backlit and active. FIG. 5G illustrates the condition where the ignition state of the ignition switch 40 is the ACC position, the audio system 28' is on and the headlights are turned on. In this condition, all groups 12', 16', 56 of switches 52, 54 are backlit and active.

Figure 6:
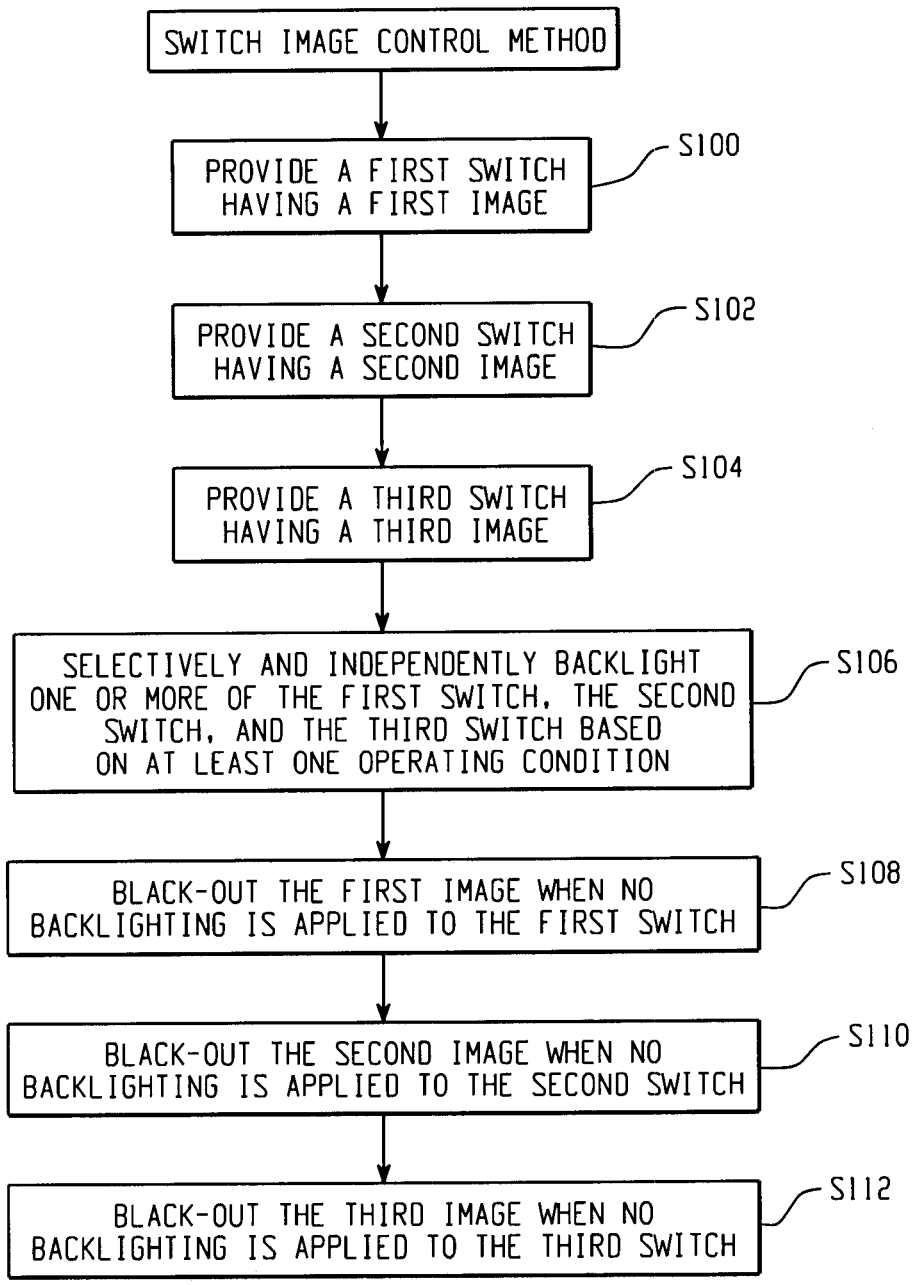
FIG. 6 is a flow chart illustrating a switch image control method for a vehicle.

According to the foregoing, and with reference to FIG. 6, a switch image control method for a vehicle will now be described. In the illustrated method, at least one first switch 12 (or the switches 50 of the first group 12') is provided having a first image 14 (S100) and at least one second switch 16 (or the switches 52 of the second group 16') is provided having a second image 18 (S102). The method can further include the provision of a third switch (e.g., the audio power switch 54) having the third image thereon (S104). One or more of the first switch 12, the second switch 16 and the third switch 54 are selectively and independently backlit to illuminate the images thereon based on at least one operating condition of the vehicle (S106). As already described, the at least one operating condition can include one or more of: the state of the ignition switch 40, the ON or OFF state of a +B or backup power supply 44a, the ON or OFF state of a lighting system 42 (e.g., parking lights, headlights, etc.), the ON or OFF state of the audio system 28', the ON or OFF state of the HVAC system 26', and/or the ON or OFF state of a communication system 44b.

When no backlighting is applied to the first switch 12, the first image 14 is blacked-out (S108). When no backlighting is applied to the second switch 16, the second image 18 is blacked-out (S110). Likewise, when no backlighting is applied to the third switch 54, the third image is blacked-out (S112). Backlighting of the switches 12, 16, 54 to illuminate the respective first, second and third images (e.g., in S104) occurs only when the respective switches 12, 16, 54 are active. Such backlighting can be in accordance with the control matrix of FIG. 4.

It will be appreciated that several of the above-disclosed and other features and functions, or alternative thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A switch image control system for a vehicle, comprising:
   at least one first switch having a first image viewable when a backlighting is applied to said at least one first switch; and
   at least one second switch having a second image viewable when said backlighting is applied to said at least one second switch, said backlighting independently applied to one or both said at least one first switch and said at least one second switch based on at least one of a plurality of operating conditions of the vehicle, wherein said at least one operating condition corresponds to an ignition state of the vehicle.

2. The switch image control system of claim 1 wherein said ignition state is based on an ignition switch having a key slot and said state include one or more of: removed from a key slot, inserted in said key slot and in an OFF position, inserted in said key slot and in an accessory state (ACC) position, inserted in said key slot and in a run state (IG1) position, and inserted in said key slot and in a start state (IG2) position.

3. The switch image control system of claim 1 wherein said ignition state includes an off state, an accessory state (ACC), a run state (IG1), and a start state (IG2).

4. The switch image control system of claim 3 wherein the ignition state is based on an ignition switch having a push button start system and said state is determined by a push of a push button to include one or more of: push of said push button in the accessory state (ACC), push of said push button in the run state (IG1), and push of said push button in the start state (IG2) position.

5. The switch image control system of claim 2 wherein said at least one key position includes: being inserted in said key slot and being in said accessory state (ACC) position, being inserted in said key slot and being in said run state (IG1) position, and being inserted in said key slot and being in said start state(IG2) position, and wherein said backlighting is applied to one or both said at least one first switch and said at least one second switch based on whether a key is inserted in said key slot and said ignition switch is in said accessory state (ACC) position, based on whether said key is inserted in said key slot and said ignition switch is in said run state (IG1) position, and based on whether said key is inserted in said key slot and said ignition switch is in said start state (IG2) position.

6. The switch image control system of claim 1 wherein said at least one operating condition additionally corresponds to an ON or OFF state of a backup power supply of the vehicle.

7. The switch image control system of claim 1 wherein said at least one operating condition corresponds to an ON or OFF state of a lighting system of the vehicle.

8. The switch image control system of claim 7 wherein said lighting system is parking lights of the vehicle, and wherein said backlighting is applied to one or both said at least one first switch and said at least one second switch based on an ON or OFF state of said parking lights.

9. The switch image control system of claim 1 wherein said at least one operating condition additionally corresponds to an ON or OFF state of an audio system of the vehicle or to an ON or OFF state of an HVAC system of the vehicle.

10. The switch image control system of claim 1 wherein said at least one operating condition additionally corresponds to an ON or OFF state of a communication system of the vehicle.

11. The switch image control system of claim 10 wherein said communication system is a hands free call system of the vehicle, and wherein said backlighting is applied to one or both said at least one first switch and said at least one second switch based on an ON or OFF state of said hands free call system.

12. The switch image control system of claim 1 wherein said first image is viewable only when said backlighting is applied to said at least one first switch, otherwise said at least one first switch has a black-out appearance, and said second image is viewable only when said backlighting is applied to said at least one second switch, otherwise said at least one second switch has a black-out appearance.

13. The switch image control system of claim 1 wherein said first image and said second image are not visible with ambient lighting or front side lighting when said backlighting is not applied to said at least one first switch and said at least one second switch.

14. The switch image control system of claim 1 wherein application of said backlighting to said at least one first switch corresponds with an operational status of said at least one first switch, and application of said backlighting to said at least one second switch corresponds to an operational status of said at least one second switch.

15. The switch image control system of claim 1 wherein said at least one operating condition additionally corresponds to an ON or OFF state of a lighting system of the vehicle.

16. A switch image control system for a vehicle, comprising:
a first group of switches having first images viewable thereon when a backlighting is applied thereto, said first group of switches corresponding to a first vehicle sub-system; and
a second group of switches having second images viewable thereon when said backlighting is applied thereto, said second group of switches corresponding to a second vehicle sub-system, said backlighting applied to one or both of said first group of switches and said second group of switches based on at least one of ignition state of the vehicle, an ON or OFF state of a backup power supply of the vehicle, an ON or OFF state of a lighting system of the vehicle, an ON or OFF state of an audio system of the vehicle, an ON or OFF state of a HVAC system, and an ON or OFF state of a communication system of the vehicle.

17. The switch image control system of claim 16 wherein said first group of switches includes HVAC control switches and said first vehicle sub-system is an HVAC system, and wherein said second group of switches includes audio control switches and said second vehicle sub-system is an audio system.

18. The switch image control system of claim 17 further including:
an audio power switch having a third image viewable when said backlighting is applied to said audio power switch based on at least one of: said ignition state of the vehicle, said ON or OFF state of said backup power supply of the vehicle, said ON or OFF state of said lighting system of the vehicle, said ON or OFF state of an audio system of the vehicle, an ON or OFF state of a HVAC system, and said ON or OFF state of said communication system of the vehicle.

19. The switch image control system of claim 18 wherein said backlighting is applied to each of said first group of switches, said second group of switches and said audio power button switch based on each of said ignition state of the vehicle, said ON or OFF state of said backup power supply of the vehicle, said ON or OFF state of a lighting system of the vehicle, said ON or OFF state of said audio system of the vehicle, an ON or OFF state of a HVAC system, and said ON or OFF state of said communication system of the vehicle.

20. A switch image control method for a vehicle, comprising:
providing at least one first switch having a first image;
providing at least one second switch having a second image; and
selectively and independently backlighting one or both of said at least one first switch to illuminate said first image and said at least one second switch to illuminate said second image based on at least one of a plurality of operating conditions of the vehicle, wherein said at least one operation condition of the vehicle includes at least one of: an ignition state of the vehicle, an ON or OFF state of a backup power supply of the vehicle, an ON or OFF state of a lighting system of the vehicle, an ON or OFF state of an audio system of the vehicle, an ON or OFF state of a HVAC system, and an ON or OFF state of a communication system of the vehicle.

21. The switch image control method of claim 20 further including:
providing an audio power switch having a third image; and
selectively and independently backlighting said audio power switch to illuminate said third image based on said at least one operating condition of the vehicle.

* * * * *